United States Patent [19]

McIntosh

[11] 4,356,988
[45] Nov. 2, 1982

[54] BASE STRUCTURE FOR BARBECUE GRILL

[75] Inventor: Lawrie McIntosh, Toronto, Canada

[73] Assignee: Shepherd Products Ltd., Canada

[21] Appl. No.: 182,947

[22] Filed: Sep. 2, 1980

[51] Int. Cl.³ ............................................... A47K 1/04
[52] U.S. Cl. .................................... 248/129; D7/108; 126/41 R; 248/188.8
[58] Field of Search ............... 248/129, 132, 310, 152, 248/174, 346, 678, 188.7, 188.8, 519, 524, 525, 526, 527, 528, 529, 149, 315, 316, DIG. 7; 126/41 R, 41 A, 41 B, 41 C, 41 D, 41 E; D7/108, 109; 73/296

[56] References Cited

U.S. PATENT DOCUMENTS

| | | | |
|---|---|---|---|
| 365,555 | 6/1887 | Tolman | 248/315 X |
| 1,977,970 | 10/1934 | Parks | 248/669 X |
| 2,646,243 | 7/1953 | Rycroft | 248/315 |
| 2,891,753 | 6/1959 | Bittle | 248/DIG. 7 |
| 3,295,802 | 1/1967 | Leatherman | 248/188.8 X |
| 3,591,114 | 7/1971 | Beatty | 248/524 X |

OTHER PUBLICATIONS

Sunbeam Grillmaster Gas Barbecue Appliances (Received on Nov. 13, 1979) 73-296.

*Primary Examiner*—William H. Schultz
*Assistant Examiner*—Ramon O. Ramirez
*Attorney, Agent, or Firm*—McWilliams, Mann & Zummer

[57] ABSTRACT

The invention relates to a base structure for an outdoor barbecue grill mounted on a stand and including a bottled propane gas container supported on the base and which comprises a one piece frame to which the stand may be secured and having an integrally formed receptacle portion for mounting a propane bottle with supporting wheels mounted adjacent the receptacle end of the frame and integrally formed feet at the opposite end of the frame.

1 Claim, 4 Drawing Figures

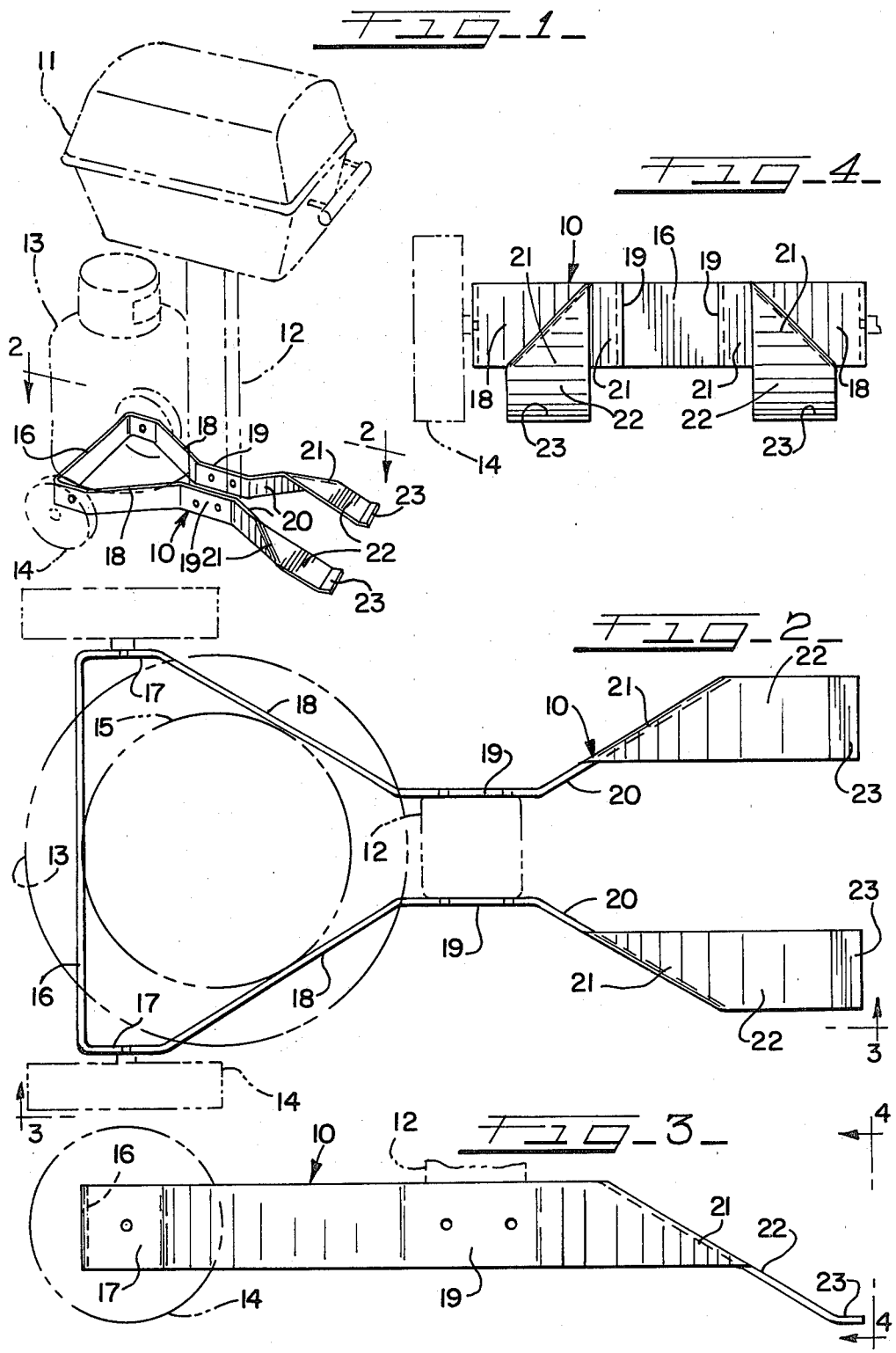

BASE STRUCTURE FOR BARBECUE GRILL

BACKGROUND OF THE INVENTION

Field of the Invention

The invention relates to outdoor barbecue grill carts that are portable, including a supporting base frame structure, a support column for a grill and having wheels and/or feet disposed for engagement with a supporting surface.

Description of the Prior Art

Heretofore, many forms of portable outdoor barbecue grills have been available but all of these within applicant's knowledge utilized base structures of complex design incorporating multiple elements required to be assembled and secured together and having specially constructed holders for a propane container and some with separately attached supporting feet at one end.

SUMMARY OF THE INVENTION

The present invention provides a base structure for a barbecue grill cart which is of simplified one piece integral construction upon which a grill stand may readily be mounted and having an integrally formed receptacle for a propane bottle with wheels mounted adjacent the propane bottle holder at one end of the base and having integrally formed feet at the opposite end of the base. The base structure is shaped to provide a generally triangular formed open frame adapted to receive and closely fit the usual bottom mounting collar found on the typical propane bottle structure. These propane bottles are normally formed with a base ring, or support that is cylindrical and is adapted to be mounted in a suitable receptacle that receives this cylindrical base wherein the bottle is mounted. In the present base structure the cylindrical base of the propane bottle is received in the triangular open frame and this frame is so formed and proportioned as to engage the base of the bottle at three points for securely mounting and retaining the bottle in the base structure.

The base structure is shaped and formed at a position intermediate its ends to mount a frame, or pedestal of a barbecue grill, whether it may be round or square, so that this central supporting column of the grill can be securely and rigidly fastened in the base structure by securing means readily mounted in this portion of the base frame. The triangular frame structure at one end of the base is also adapted to mount a pair of suitable wheels for transporting the barbecue cart from one place to another if the cart is proposed to be transported in this manner. Otherwise, the base frame might be provided with integrally formed supporting feet at this end of the frame. At the opposite end of the base frame a pair of laterally spaced feet are formed by providing a twist in each leg of the frame to dispose a flat bearing face in generally horizontal positions for engagement with a supporting surface.

OBJECTS OF THE INVENTION

The primary purpose of the invention is the improvement of a base structure for a portable barbecue grill whereby the base is simplified one piece open frame construction.

The principal object of the invention is to provide a one piece integral base structure for a barbecue grill adapted to mount and retain a propane gas tank within the open framework of the base.

An important object of the invention is the provision of an integral base structure for a barbecue grill having an open frame adapted to have a grill stand column secured directly therein.

Another object of the invention is to provide an open framework base structure for a barbecue grill fabricated from a flat plate formed to provide a propane tank mounting adjacent one end, a connection for an upright column intermediate the ends of the base and a pair of spaced legs at one end twisted to form feet adapted to engage a supporting surface.

A further object of the invention is the provision of an open framework base structure for a barbecue grill cart having a closed end formed to support and retain a propane tank and a pair of legs at the other end of the structure having a pair of spaced apart feet for engagement with a supporting surface.

DESCRIPTION OF THE DRAWINGS

The foregoing and other and more specific objects of the invention are attained by the construction and arrangement illustrated in the accompanying drawings wherein FIG. 1 is a general perspective view of a barbecue grill showing the base frame with the grill stand, wheels and propane tank shown in phantom lines;

FIG. 2 is a plan view of the base frame to larger scale;

FIG. 3 is a side elevational view of the base frame; and

FIG. 4 is an end elevational view of the base frame showing the spaced feet members.

DESCRIPTION OF PREFERRED EMBODIMENT

A complete barbecue grill stand is indicated in FIG. 1 wherein the grill and supporting upright as well as the propane gas bottle and the transport wheels are illustrated in dot-and-dash lines with the supporting base 10 shown in full lines. The grill stand includes the grill 11, a supporting upright 12, the propane gas bottle 13 and wheels 14. The propane bottle 13 includes a bottom supporting base, or frame 15, as best indicated in FIG. 2 to which the base frame 10 is specifically proportioned and substantially fitted.

The base frame structure 10 is formed of one continuous integral piece of metal bar stock and is shaped to provide a cross-piece 16 which is bent at each end to provide wheel pieces 17 that extend forwardly at each side of the frame in parallel relation. The wheels 14 are suitably journaled in these wheel pieces. From the respective wheel pieces the base frame is bent inwardly and forwardly as at 18 at an angle such as to approach each other toward the approximate center of the base frame where they are bent again to extend forwardly in spaced relation as at 19 to provide a central frame portion adapted to receive the vertical support, or upright 12, for the grill. The support 12 may be secured between the frame portions 19 by suitable fastenings such as bolts extending through the frame at both sides and the member 12 thus rigidly to mount the upright member in the base structure.

It should be noted that the triangulated pocket formed by the frame portions 16 and 18 provides a closely fitting receptacle for the propane bottle 13 and wherein the base 15 of the bottle fits within the triangle formed by the frame portions with the cross-piece 16 and the two frame portions 18 that angle forwardly affording a three point support for the bottle 13. The three frame portions referred to closely fit the base 15 on the bottle and prevent horizontal displacement, or movement that might dislodge the bottle while also providing vertical support for the bottle on the top edges of these frame portions.

The base frame structure flares outwardly from the central frame portions 19, as at 20, to form spaced legs for this end of the base and which diverge outwardly to provide wide based supporting members. The divergent leg members 20 are each formed with a twist 21 to translate the vertical orientation of the metal bar comprising the frame, to a sloping forward extension 22 of each leg and which are disposed in spaced parallel relation to each other. These forwardly extending sloping members 22 are formed at their terminal ends with feet portions 23 which are formed by bending the sloping portions 22 to a horizontal plane.

The base frame structure has been described as having a triangulated open framework pocket for the propane container but this portion of the base framework might take other forms while retaining the open framework feature for the support pocket. The open framework might be constructed somewhat in the form of a rectangle, or of generally rectilinear or other form of a type that would retain the open pocket for the propane bottle.

CONCLUSION

From the foregoing it will be seen that there has been provided a base frame structure for a barbecue grill cart that is formed from one continuous piece of flat bar stock to provide a triangulated open pocket acting as a receptacle for a propane bottle having three point support and a spaced apart central portion for mounting a grill supporting upright column and a pair of divergent forwardly extending spaced apart legs each of which is twisted from a vertical orientation to a forwardly sloping position, which terminate in horizontally disposed supporting feet.

What is claimed is:

1. A generally horizontally disposed one piece base frame structure for a barbecue grill including an open framework formed integrally from a single metal plate disposed edgewise vertically, said frame being shaped adjacent one end of the frame to form an opening receiving a container, said opening in the frame being triangular and providing a three sided support structure for the container affording a three point support, said three point support having a cross piece forming an end of the base frame structure and comprising one side of said three sided structure, converging side frame portions defining two of said three sides with all three sides closely engaging a base member on the container where the container fits into support structure, a pair of parallel frame portions intermediate the length of the base frame structure spaced apart to receive and secure a vertical support for a grill, a pair of divergent leg members extending outwardly from the intermediate frame portions, said leg members each having an outwardly sloping portion bent on an angle from the respective members and a generally horizontally disposed supporting foot extending outwardly from each sloping portion for engagement with a supporting surface, said divergent leg members each formed with a twisted area from said vertical edgewise position to respective positions substantially at right angles thereto to provide said horizontally disposed foot portions.

* * * * *